C. H. FRAZIER.
VEHICLE TIRE TOOL.
APPLICATION FILED JUNE 17, 1907.
979,279.
Patented Dec. 20, 1910.
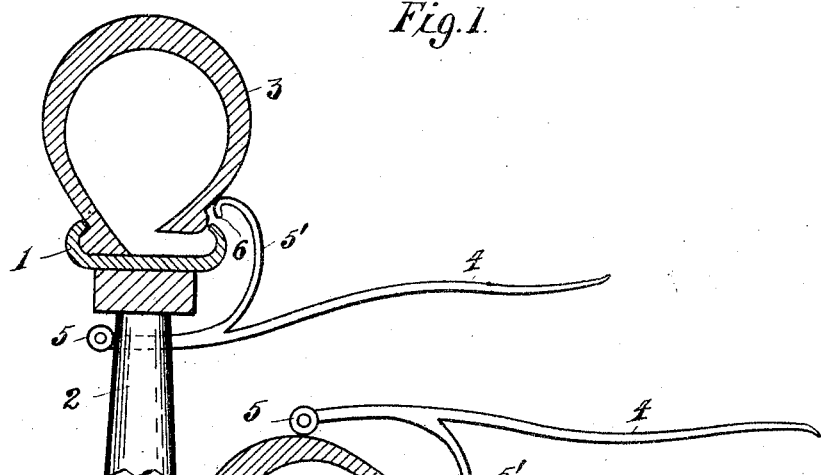
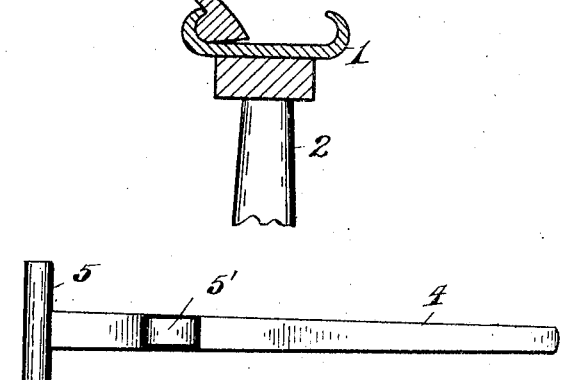
Witnesses:
George Oltsch
G. M. Cole.
Charles H. Frazier
Inventor
By
Atty.

UNITED STATES PATENT OFFICE.

CHARLES H. FRAZIER, OF SOUTH BEND, INDIANA.

VEHICLE-TIRE TOOL.

979,275.  Specification of Letters Patent.  Patented Dec. 20, 1910.

Application filed June 17, 1907. Serial No. 379,415.

*To all whom it may concern:*

Be it known that I, CHARLES H. FRAZIER, a citizen of the United States, residing at South Bend, in the county of St. Joseph and State of Indiana, have invented certain new and useful Improvements in Vehicle-Tire Tools, of which the following is a specification.

This invention relates to implements employed in connection with pneumatic tires, and has for its object to produce a simply constructed implement of this character whereby the tire may be readily removed from the rims or replaced thereon as required.

In the use of automobile tires which are usually of the inflatable or pneumatic type, it is frequently necessary to remove and replace the tires upon their rims. It is also frequently necessary to remove the inner tubes to enable the stay bolts to be removed and replaced. It has been found quite difficult to remove the tires or replace them without injury owing to the form of the tool heretofore used in the operation.

It is therefore another object to provide a tool adapted to have a sure hold on the tire regardless of what position the tool may be required to assume and without the possibility of injuring the tire in its removal from or its replacing upon the wheel.

With the above and other objects in view, the present invention consists in the combination and arrangement of parts hereinafter more fully described, illustrated in the accompanying drawings, and particularly pointed out in the appended claim, it being understood that changes may be made in the form, size, proportion, and minor details without departing from the spirit or sacrificing any of the advantages thereof.

In the drawings:—Figure 1 is a sectional view of a tire illustrating the application of my improved tool in the act of placing a pneumatic tire upon its rim. Fig. 2 is a similar view illustrating the application of my improved tool in the act of removing a tire from its rim. Fig. 3 is a detail view of the tool itself.

Referring now more particularly to the accompanying drawings, the reference character 1 indicates a rim of a wheel carried by spokes 2 in the usual manner, the reference character 3 indicating a pneumatic tire shoe partly unseated with respect to the rim 1 the inflated inner tube not being shown as it forms no part of the present invention.

The improved implement comprises a stock or shank having at one end oppositely extending lateral projections forming a T head 5, the T head portion being preferably larger than the stock and circular in cross section, as shown. Extending from the stock 4 at a relatively short distance from the head 5 is an arm 5' preferably curved as shown and terminating in a hook 6 the hook being disposed at right angles to the head 5 and in alinement with the longitudinal plane of the stock. The implement thus described is formed in one single piece of metal, preferably of steel.

With an implement thus constructed it is a comparatively easy matter to remove a tire from its rim or to replace it thereon, and to place a tire in position upon the rim it is only necessary to place the tire around the rim with one of its edge ribs beneath one of the inturned curved edges of the rim and dispose the implement with one of the projections of its head 5 in engagement with one of the spokes 2 of the wheel and with the hooked end 6, of the arm 5' engaging the other edge rib of the tire. Thus by operating the other end of the stock 4 the tire will be forced into position to enable the portion of the said other edge rib adjacent to the arm 5' to be engaged with the other lip of the rim 1. The implement is then moved along to engage with the next spoke and the operation repeated, and so on around the wheel until the whole tire is inserted into its rim. When a tire is to be removed the lateral head 5 is disposed against the body of the tire and the hooked terminal 6 of the arm 5' forced inwardly between the corresponding edge rib and the tire, and then by an upward pull upon the stock the portion of the tire adjacent to the implement will be drawn free from the rim. The hook 6 of the arm 5' is then moved along and the tire engaged at another point and engaged in the same manner, and so on until the tire is removed from its rim.

The implement is very simple in structure and can be inexpensively manufactured and operates effectually for the purposes required, and without injury to the rim or to the tire.

It will thus be seen that when removing the tire the bill of the hook 6 engages the edge of the tire and when applying the tire, as shown in Fig. 1, the back of the hook engages the side of the tire for forcing the latter upon the rim.

The implement may be manufactured in various sizes to suit tires of various dimensions.

What is claimed is:—

A tire tool formed of a single piece of metal stock comprising a shank portion curved slightly intermediate its ends, one end formed with laterally extending projections circular in cross section, and directly opposing each other and a curved arm integral with and depending from the shank portion intermediate the ends of the latter, the curved arm being provided at its free end with a hook.

In testimony whereof I have signed my name to this specification in the presence of two subscribing witnesses.

CHARLES H. FRAZIER.

Witnesses:
GEORGE OLTSCH,
DAWN ERNSPERGER.